(12) United States Patent
McCollum et al.

(10) Patent No.: US 6,930,514 B2
(45) Date of Patent: Aug. 16, 2005

(54) METHOD AND APPARATUS FOR TRANSFERRING DATA BETWEEN DATA BUSES

(75) Inventors: Justin Randolph McCollum, Lawrenceville, GA (US); Stephen Scott Piper, McDonough, GA (US); David Michael Head, Suwanee, GA (US)

(73) Assignee: LSI Logic Corporation, Milpitas, CA (US)

( * ) Notice: Subject to any disclaimer, the term of this patent is extended or adjusted under 35 U.S.C. 154(b) by 86 days.

(21) Appl. No.: 10/261,990

(22) Filed: Sep. 30, 2002

(65) Prior Publication Data

US 2004/0061528 A1 Apr. 1, 2004

(51) Int. Cl.[7] .......................................... H03K 19/0175
(52) U.S. Cl. .......................................... 326/80; 326/82
(58) Field of Search ........................ 326/37–41, 80–83, 326/86

(56) References Cited

U.S. PATENT DOCUMENTS

| | | | | |
|---|---|---|---|---|
| 5,248,908 A | * | 9/1993 | Kimura | 326/38 |
| 5,680,063 A | * | 10/1997 | Ludwig et al. | 326/80 |
| 5,877,633 A | * | 3/1999 | Ng et al. | 326/80 |
| 6,472,903 B1 | * | 10/2002 | Veenstra et al. | 326/38 |
| 6,762,621 B1 | * | 7/2004 | El-Ayat | 326/38 |

\* cited by examiner

Primary Examiner—Don Le
(74) Attorney, Agent, or Firm—Duft Bornsen & Fishman, LLP

(57) ABSTRACT

Systems and methods for transferring data. A circuit transfers information between two buses using different signal voltage levels and multiplexes signals applied to the second bus over multiple devices coupled thereto. The data on a first data bus is transferred at a first voltage level and the data on a second data bus is transferred at a second voltage level. For example, the first data bus may transfer data at 3.3V and the second data bus may transfer data at 5V. A logic device (e.g., a CPLD) is connected between the first and the second data buses for transferring the data between the first and second voltage levels. The logic device is also configured for multiplexing the data with the second voltage level between first and second devices (e.g., one or more LEDs and/or NVSRAMs) connected to the second data bus.

18 Claims, 4 Drawing Sheets

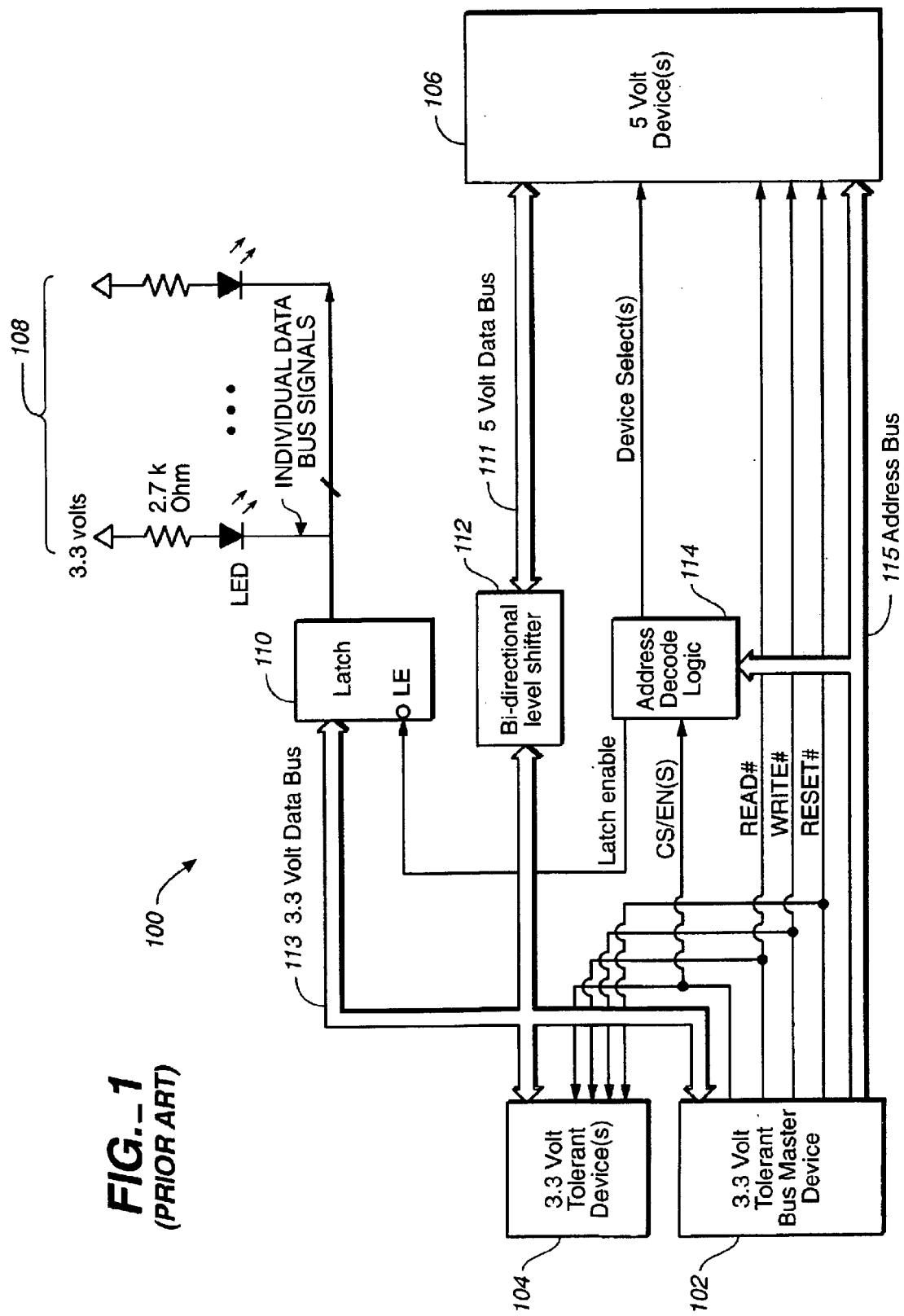
FIG._1
*(PRIOR ART)*

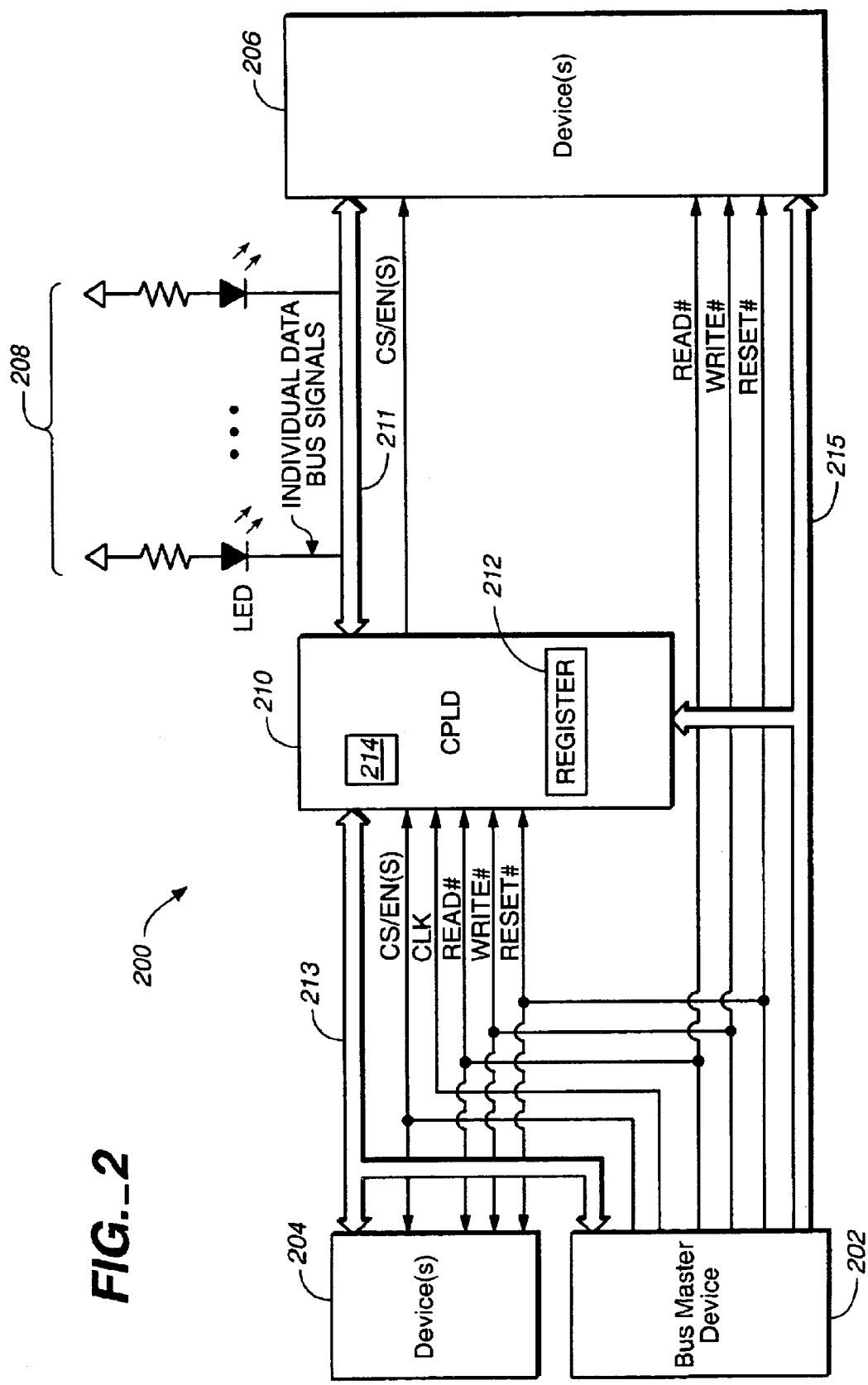
FIG._2

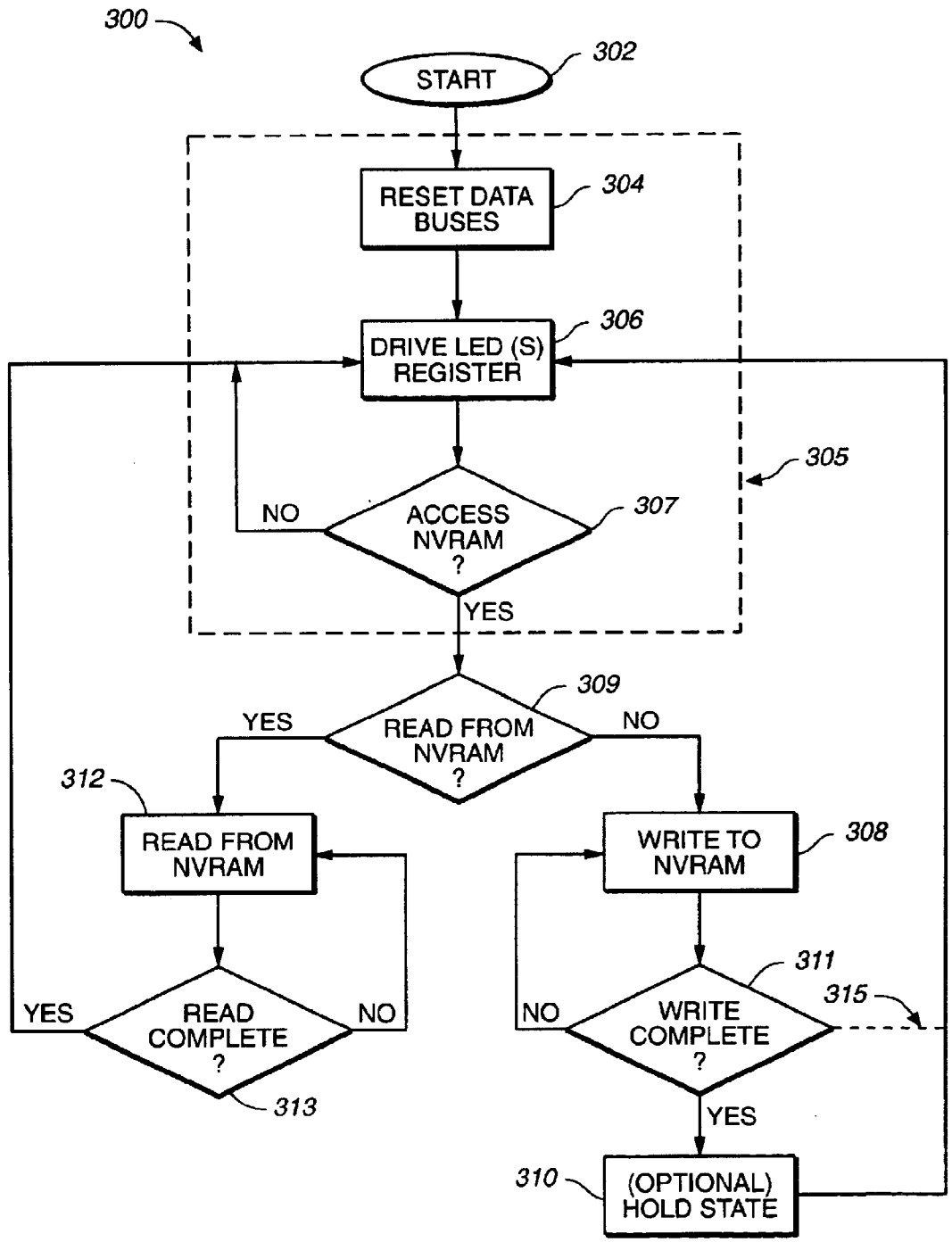
FIG._3

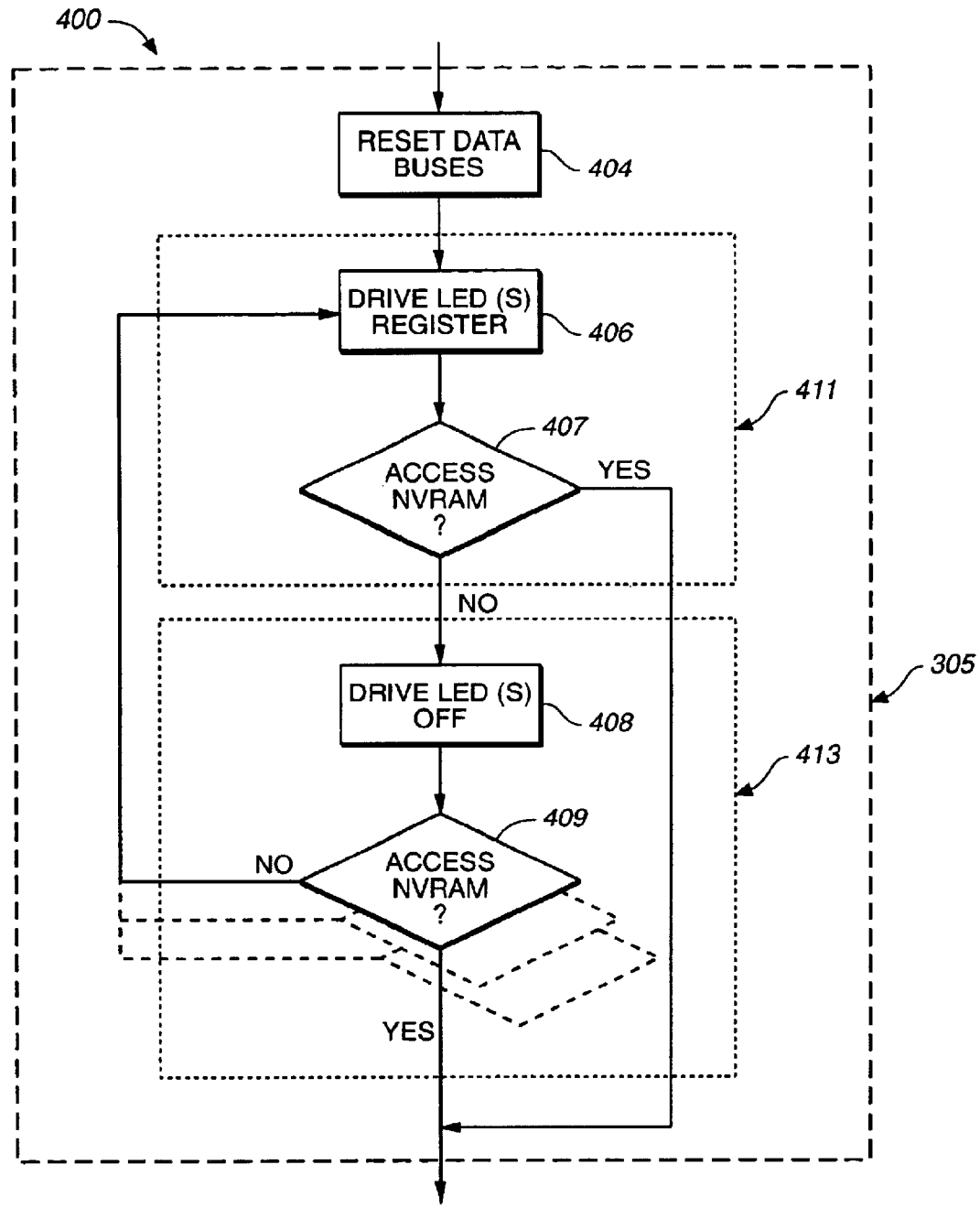
FIG._4

METHOD AND APPARATUS FOR TRANSFERRING DATA BETWEEN DATA BUSES

BACKGROUND OF THE INVENTION

1. Field of the Invention

The present invention is generally directed toward transferring data of multiple voltage levels between data busses. More specifically, the invention relates to transferring data between devices on a first data bus and a second data bus where the data buses use different signal voltage levels and where the second bus utilizes multiplexing structures to apply data to each of multiple devices coupled thereto.

2. Discussion of Related Art

Many circuit components transfer data between one another. Typically, the circuit components transfer the data through a data bus when parallel communications are desired. Some circuit components operate on voltages that differ from operating voltages of the other components. To ensure the voltage tolerances of each component are not breached, the components are often grouped according to operating voltage levels. Each group of components is connected to a data bus that serves a particular operating voltage level for a specific group of components. For example, a group of components that operates on 3.3 Volts (V) is connected to a 3.3V tolerant data bus, and a group of components that operates on 5V is connected to a 5V tolerant data bus.

In a circuit configuration, many of the components within each group must communicate to components within other groups. Since the voltages between the groups of the components may differ, a bi-directional voltage level shifter is typically employed to translate the voltage level of the data on one data bus to another voltage level for another data bus. As in the previous example, data being transferred from the 5V tolerant data bus to the 3.3V tolerant data bus would be translated, or "stepped down", to 3.3V by the bi-directional voltage level shifter that is connected to each of the data buses.

While the bi-directional voltage level shifter serves the function of translating voltage levels between two data buses, a problem arises as circuits attempt to add more components to increase functionality. For example, a 3.3V bus master device may need to communicate to a 5V Non Volatile Synchronous Random Access Memory (NVSRAM) through the bi-directional voltage level shifter. To control the NVSRAM, the bus master device must use address-decode logic to access addresses of the NVSRAM. Often the address-decode logic is integrated with the voltage level shifter in a custom logic circuit. The address-decode logic increases circuit size and pin count of such a custom circuit. The increase in pin counts due to the addition of components increases costs and decreases reliability as more pins provide potential for additional faults and may require the use of larger, more costly custom programmable integrated circuits.

One example of an additional component that may be coupled to the second bus is a diagnostic display such as a bank of Light Emitting Diodes (LED) used as indicators. Such LEDs are often used to add functionality to a circuit by allowing a user to view certain operative characteristics of the circuit. For example, the LEDs may be used to indicate a likely failure mode for service technicians or may be used to indicate status of the associated device. When the LEDs are added to the circuit and connected such that the LEDs are controlled by a bus master device, an additional latch device is often used to transfer control data from the bus master device to the LEDs and to latch the transferred data for continued display on the LEDs. The latch device holds the control data such that the LEDs remain illuminated for as long as necessary. The additional latch device also increases circuit size and pin count, further increasing costs and decreasing reliability. Furthermore, the LEDs consume power inefficiently and increase operating costs of the circuit.

As evident from the above discussion, a need exists for improved structures and methods for increasing functionality of such a circuit while decreasing pin counts and improving circuit reliability.

SUMMARY OF THE INVENTION

The present invention solves the above and other problems to advance the state of the useful arts by providing methods and structure for a circuit to transfer information between two buses using different signal voltage levels and to multiplex signals applied to the second bus over multiple devices coupled thereto. In one exemplary preferred embodiment, the devices coupled to the second bus may include an NVSRAM device and a bank of LED indicators, both driven at 5V, and numerous other devices driven at 3.3V coupled to the first bus. The invention may embody a Complex Programmable Logic Device (CPLD) with logic therein to transfer signals between the two buses.

Another aspect of the invention provides for a register within the CPLD to obviate the need for an external latch to drive the LEDs. The register may also provide a general purpose read/write feature to function as a scratchpad memory for purposes related to the CPLD logic.

Another aspect of the invention may provide for an adjustable duty cycle in driving the LEDs to reduce power consumption in the circuits.

In one aspect of the invention, a circuit transfers data and includes: a first data bus configured for transferring the data of a first voltage level; a second data bus configured for transferring the data of a second voltage level; and a logic device connected between the first and second data buses for transferring the data between the first and second voltage levels and for multiplexing the data of the second voltage level between first and second devices.

In another aspect of the invention, the first voltage level is about 3.3 Volts.

In another aspect of the invention, the second voltage level is about 5 Volts.

In another aspect of the invention, the first device includes one or more LEDs.

In another aspect of the invention, the logic device includes a CPLD. The CPLD may include a programmable register for transferring the data of the second voltage level to the LEDs, the programmable register enabling read and write operations. The CPLD may include a duty cycle controller for controlling a duty cycle in which the data of the second voltage level is transferred to the LEDs relative to a clock cycle.

In another aspect of the invention, the second device includes one or more RAM devices.

In another aspect of the invention, the circuit further includes a bus master device connected to the first data bus for controlling transference of the data of the first voltage level.

In one aspect of the invention, a method for transferring data is provided and includes steps of: conveying the data between a first voltage level on a first data bus and a second voltage level on a second data bus; and multiplexing the data on the second data bus between first and second devices connected to the second data bus in response to conveying the data.

In another aspect of the invention, the first voltage level is about 3.3 Volts.

In another aspect of the invention, the second voltage level is about 5 Volts.

In another aspect of the invention, the step of multiplexing includes a step of multiplexing the data between one or more LEDs and one or more RAM devices using a CPLD.

In another aspect of the invention, the method includes a step of controlling a duty cycle in which the data is transferred to the LEDs relative to a clock cycle.

In another aspect of the invention, the step of multiplexing the data between the LEDs and the RAM device includes a step of holding the data for the RAM device on the second data bus for one or more clock cycles after a write to the RAM device. The step may also include a step of determining which of the devices to operate using a chip select signal.

In another aspect of the invention, the method includes a step of controlling the first and second data buses with a bus master device.

In another aspect of the invention, the method includes a step of determining a read request and a write request from the data.

Advantages of the invention include a reduction in pin count for a circuit by using fewer components and programmably multiplexing data between devices on a data bus. Other advantages include adjusting a duty cycle of the data transferred to LEDs to decrease power consumption by the LEDs.

BRIEF DESCRIPTION OF THE PREFERRED EMBODIMENTS

FIG. 1 is a block diagram illustrating a prior art circuit for transferring data between data buses.

FIG. 2 is a block diagram illustrating an exemplary preferred system of the invention.

FIG. 3 is a flow chart diagram illustrating an exemplary preferred operation of the invention.

FIG. 4 is a flow chart diagram illustrating an exemplary preferred step of the operation of the invention.

DETAILED DESCRIPTION OF THE PREFERRED EMBODIMENTS

With reference now to the figures, a prior art circuit for transferring data of differing voltage levels between data buses 113 and 111 is shown in circuit 100. Circuit 100 includes 3.3V tolerant bus master device 102, 3.3V tolerant device(s) 104, 5V device(s) 106, LED(s) 108, latch 110, bi-directional level shifter 112, and address decode logic 114. Bus master device 102 controls data being transferred on data bus 113 and data bus 111. When communicating to LED(s) 108, data is transferred over data bus 113 and latched to LED(s) 108 via latch 110. Latch 110 is a discrete device capable of write-only operations. When communicating to device(s) 106, data is transferred between data buses 111 and 113 through level shifter 112. Level shifter 112 transfers data of one voltage level on data bus 111 to data bus 113. Bus master device 102 also identifies particular locations, or addresses, of device(s) 106 via address bus 115. Address bus 115 is also connected to address-decode logic 114 for decoding the addresses of device(s) 106.

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 2, an exemplary preferred embodiment of the invention is shown in system 200. System 200 is configured to transfer data. System 200 includes data buses 213 and 211. Data bus 213 is configured for transferring the data of a first voltage level while data bus 211 is configured for transferring the data of a second voltage level. System 200 also includes CPLD 210 connected between data buses 213 and 211 for transferring the data between the two data buses. For example, data being transferred from a 5V device connected to data bus 211 to a 3.3V device connected to data bus 213 passes through CPLD 210 without damaging the 3.3V device. As CPLD 210 may be a 3.3V tolerant device, it may be capable of tolerating higher voltages and thereby transferring data at a lower voltage (e.g., 3.3V). CPLD 210 also multiplexes the data with the second voltage level between devices, such as LED(s) 208 and device(s) 206. Examples of device(s) 204 include 3.3V tolerant devices and examples of device(s) 206 include 5V tolerant NVSRAM. CPLD 210 may include a plurality of programmable logic gates to perform logical functions as specified by programming instructions. Those skilled in the art should appreciate that CPLD 210 may be connected to other data buses for transferring data of other voltage levels and multiplexing such data. For example, multiple data buses may be used such that each data bus transfers data of a voltage level that differs from the first voltage level and/or the second voltage level. As a further example, multiplexing between devices may also occur on one or more of the data buses. The invention is not intended to be limited to the number of data buses, types of multiplexing, and/or devices of the preferred embodiment.

Bus master device 202 may control data transfer from device(s) 204 to device(s) 206. Bus master device 202 may control the data transfer by generating a chip select signal that is used to determine which of device(s) 204, device(s) 206, and/or device(s) 208 are to receive and/or transfer the data. For example, device(s) 206 may include one or more NVSRAM devices in which the chip select signal is used to determine which of the NVSRAM devices is to be accessed. Voltage levels of the data of device(s) 204 may differ from the operating voltage(s) of device(s) 206. As such, CPLD 210 may transfer the data between device(s) 204 and device (s) 206 by tolerating higher voltages and outputting data with voltages that are within an acceptable range of CPLD 210. Furthermore, CPLD 210 may be programmed to multiplex the data between device(s) 208 and device(s) 206 connected to data bus 213 as the data is transferred from data bus 213 to data bus 211.

CPLD 210 may, therefore, remove the need for a bi-directional level shifter, such as bi-directional level shifter 112 of FIG. 1. CPLD 210 may also remove the need for a latch, such as latch 110 of FIG. 1, since CPLD 210 may incorporate functionality of a latch in programmable register 212. For example, programmable register 212 may be configured for transferring the data of the second voltage level to device(s) 208 by latching the data to device(s) 208. Programmable register 212 may also permit read and write operations thereto that allow a user to read data that was written to device(s) 208. Such a feature provides a "scratchpad" storage location for calculations or other temporary storage needs of the circuit In one embodiment of the invention, CPLD 210 includes duty cycle controller 214 for determining a duration in which device(s) 208 receive data. As such, duty cycle controller 214 may implement monitoring cycles (described in FIG. 4) in which CPLD 210 monitors accesses to devices 206 (e.g., NVSRAM devices) by bus master device 202. For example, if device(s) 208 include LEDs, the LEDs may be illuminated relative to the monitoring cycle lasting one or more clock cycles in duration. Such an illumination would occur during an "on-monitoring cycle". In multiplexing the data between device(s) 206 and the LEDs, CPLD 210 may determine access to device(s) 206. If CPLD 210 determines an access to device(s) 206 exists, data may be transferred to or from device(s) 206 and, thus, to the LEDs. However, as the LEDs may operate as "parasitic witnesses" to the flow of data on bus 211, the transfer may occur so fast as to illuminate the LEDs in an unnoticeable manner. If no access to device(s) 206 exists, then the LEDs may be "driven off" to conserve power in such an "off-monitoring cycle", or they may be driven with the contents of register 212. Afterwards, CPLD 210 may determine another access to device(s) 206 exists, again occurring over a monitoring cycle. Thus, the LEDs remain "driven on" for one of two monitoring cycles thereby controlling the duty cycle of the driven on time for the LEDs to fifty percent (i.e., 50% Duty Cycle). Additional monitoring cycles may be cascaded in duty cycle controller 214 to increase the ratio of the driven on time to the number of monitoring cycles, thereby further adjusting the duty cycle of the driven on time.

In other embodiments of the invention, CPLD 210 may include a voltage translator for electrically translating data of one voltage level to one or more additional voltage levels. For example, CPLD may be configured to translate 3.3V data to 5V data by stepping up the voltage level of the data. Similarly, CPLD 210 may step down the voltage level of the data from 5V to 3.3V.

FIG. 3 illustrates exemplary preferred operation 300 of circuit 200 of FIG. 2. Operation 300 commences, in step 302. Bus master device 202 resets data buses 213 and 211, in step 304. Bus master device 202 may drive device(s) 208 (e.g., LEDs) by transferring data to register 212 of CPLD 210, in step 306. CPLD 210 may select device(s) 206 if bus master device 202 accesses device(s) 206 (e.g., NVSRAM), in decision block 307. If no access is desired, CPLD 210 may continue to drive device(s) 208 with data stored in register 212. If access is desired, bus master device 202 may determine what type of access is desired of device(s) 206, in decision block 309. Steps 304 and 306 and decision block 307 form operation block 305.

If desired access includes a read operation, bus master device 202 may instruct device(s) 206 to transfer data over data bus 211 to CPLD 210, in step 312. CPLD 210 may transfer the data on data bus 211 to data bus 213 by tolerating a higher voltage level than the devices, such bus master device 202, connected to data bus 213 are capable of receiving. As such, CPLD 210 may output a voltage that the devices are capable of receiving. After performing step 312, CPLD 210 may determine if the read operation is complete, in decision block 313. If the read operation is complete, CPLD 210 may return to driving device(s) 208, in step 306. If the read operation is not complete, in decision block 313, CPLD 210 may allow the read operation to continue until complete.

If desired access includes a write operation, bus master device 202 may transfer data over data bus 213 to CPLD 210, in step 308. CPLD 210 may transfer data on data bus 213 to device(s) 206 over data bus 211. After performing step 308, CPLD 210 may determine if the write operation is complete, in decision block 311. If the write operation is complete, CPLD 210 may return to driving device(s) 208, in step 306, as indicated by dashed line 315. If the write operation is not complete, CPLD 210 may continue performing the write operation until complete. In one embodiment of the invention, CPLD 210 may hold the present state of the data being transferred to device(s) 206 on bus 211 when the write operation is complete, in step 310. These optional "hold state(s)" of step 310, allow an extra hold period for device(s) 206 to be written. The length of the hold states may be one or more clock periods depending on the number of states (e.g., step 310) added. CPLD 210 may return driving device(s) 208, in step 306.

In one embodiment of the invention, upon determining access to device(s) 206, device(s) 208 may be driven with data transferred to and/or from device(s) 206. However, the data transferred to device(s) 206 may be intermittent enough so as to appear to not activate device(s) 208. For example, data being transferred to and/or from an NVSRAM may also be transferred to LEDs that are connected to the same data bus (e.g., data bus 211). However, the LEDs may illuminate so fast and/or lightly as a result of the data transfer that the LEDs go undetected by an observer. Thus multiplexing of the data on data bus 211 by CPLD is 210 is accomplished. Those skilled in the art should appreciate that other types of multiplexing may be used that fall within the scope of the invention.

FIG. 4 illustrates another exemplary preferred embodiment of operation block 305 of operation 300 of FIG. 3. Operation block 305 may illustrate functionality found in duty cycle controller 214 of FIG. 2. In operation block 305, bus master device 202 resets data buses 213 and 211, in step 404. CPLD 210 may drive device(s) 208 (e.g., LEDs) by transferring data from register 212 of CPLD 210, in step 406. CPLD 210 may determine if bus master device 202 desires an access to device(s) 206 (e.g., NVSRAM), in decision block 407. Step 406 and decision block 407 may cooperatively form on-monitoring cycle 411.

If no access is desired, CPLD 210 may drive device(s) 208 to an off state to conserve power, in step 408. If access is desired, CPLD 210 may determine what type of access is desired of device(s) 206, as in decision block 309 of FIG. 3. Upon driving device(s) 208 to an off state, CPLD 210 may again determine if bus master device 202 desires an access to device(s) 206, in decision block 409. If no access is desired, CPLD 210 may again drive device(s) 208 by transferring data from register 212 of CPLD 210 to bus 211, in step 406. If access is desired, CPLD 210 may determine what type of access is desired of device(s) 206, as in decision block 309 of FIG. 3.

Step 408 and decision block 407 may cooperatively form off-monitoring cycle 413. The number of one or more steps and/or decision blocks, such as step 408 and decision block 409, may be cascaded to increase the duration of off-monitoring cycle 413 by increasing the number of clock cycles before device(s) 208 may be driven on again. By increasing the duration of off-monitoring cycle 413 between transfers of data to device(s) 208, operation block 305 may decrease the duty cycle in which device(s) 208 receive data and/or power, thereby, conserving power for the system. For example, in operation block 305, if each on-monitoring cycle and off-monitoring cycle uses one clock cycle, device (s) 208 may receive data and/or power for a period of one of two total clock cycles when traversing the steps/decisions of step 406, decision block 407, step 408, decision block 409, and back to step 406. Therefore, device(s) 208 may have a duty cycle of 50%, in which device(s) 208 receive power and/or data. Other components of the off-monitoring cycle may be cascaded below decision block 409 to further decrease the duty cycle in which device(s) 208 receive data and/or power. For example, connecting an additional decision block 409 to off-monitoring cycle 413, may add one clock cycle to the ratio (e.g., duty cycle determination), thereby creating a duty cycle of 33.3%. Those skilled in the art should appreciate that other steps and/or decision blocks may be used to increase and/or decrease the duty cycle in which device(s) 208 receive data and/or power.

Those skilled in the art will understand that other methods can be used to transfer data over data buses that fall within the scope of the invention.

Instructions that perform the operations of FIGS. 3 and 4 can be stored on storage media. The instructions can be retrieved or programmed and executed by a microprocessor, CPLDs, and/or Field Programmable Gate Arrays (FPGA), such as CPLD 210 of FIG. 2, for example. Some examples of instructions are software, program code (e.g., VHDL, verilog, and binary code), and firmware. Some examples of storage media are memory devices, tapes, disks, integrated circuits, and servers. The instructions are operational when executed by the microprocessor, the CPLD, and/or the FPGA to direct the microprocessor, the CPLD, and/or the FPGA to operate in accord with the invention. Those skilled in the art are familiar with instructions and storage media.

Advantages of the invention include a reduction in pin count for a circuit by using fewer components and programmably multiplexing data between devices on a data bus. Other advantages include adjusting a duty cycle of the data transferred to LEDs to decrease power consumption by the LEDs.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A circuit for transferring data, comprising:
   a first data bus configured for transferring the data of a first voltage level;
   a second data bus configured for transferring the data of a second voltage level; and
   a logic device connected between the first and second data buses for transferring the data between the first and second voltage levels and for multiplexing the data of the second voltage level between first and second devices on the second data bus,
   wherein the first device includes one or more LEDs.

2. The circuit of claim 1, wherein the first voltage level is about 3.3 Volts.

3. The circuit of claim 1, wherein the second voltage level is about 5 Volts.

4. The circuit of claim 1, wherein the logic device includes a CPLD.

5. The circuit of claim 4, wherein the CPLD includes a programmable register for transferring the data of the second voltage level to the LEDs, the programmable register enabling read and write operations.

6. The circuit of claim 4, wherein the CPLD includes a duty cycle controller for controlling a duty cycle in which the data of the second voltage level is transferred to the LEDs relative to a clock cycle.

7. The circuit of claim 1, wherein the second device includes one or more RAM devices.

8. The circuit of claim 1, further including a bus master device connected to the first data bus for controlling transference of the data of the first voltage level.

9. The circuit of claim 1, wherein the logic device includes a voltage translator configured for electrically translating data of one voltage level to one or more additional voltage levels.

10. A method for transferring data, including steps of:
    conveying the data between a first voltage level on a first data bus and a second voltage level on a second data bus; and
    multiplexing the data on the second data bus between first and second devices connected to the second data bus in response to conveying the data,
    wherein the first device includes one or more LEDs.

11. The method of claim 10, wherein the first voltage level is about 3.3 Volts.

12. The method of claim 10, wherein the second voltage level is about 5 Volts.

13. The method of claim 10, wherein the step of multiplexing includes a step of multiplexing the data between the one or more LEDs and one or more RAM devices using a CPLD.

14. The method of claim 13, further including a step of controlling a duty cycle in which the data is transferred to the LEDs relative to a clock cycle.

15. The method of claim 13, wherein the step of multiplexing the data between the LEDs and the RAM device includes a step of holding the data for the RAM device on the second data bus for one or more clock cycles after a write to the RAM device.

16. The method of claim 13, further including a step of determining which of the devices to operate using a chip select signal.

17. The method of claim 10, further including a step of controlling the first and second data buses with a bus master device.

18. The method of claim 10, further including a step of determining a read request and a write request from the data.

* * * * *